(12) United States Patent
Wyss et al.

(10) Patent No.: US 10,516,716 B2
(45) Date of Patent: *Dec. 24, 2019

(54) SYSTEM AND METHOD FOR RECORDING AND MONITORING COMMUNICATIONS USING A MEDIA SERVER

(71) Applicant: Interactive Intelligence Group, Inc., Indianapolis, IN (US)

(72) Inventors: Felix Immanuel Wyss, Zionsville, IN (US); Michael D. Snyder, Noblesville, IN (US); Kevin O'Connor, Saint Augustine, FL (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/215,069

(22) Filed: Jul. 20, 2016

(65) Prior Publication Data
US 2016/0330263 A1    Nov. 10, 2016

Related U.S. Application Data

(63) Continuation of application No. 13/446,182, filed on Apr. 13, 2012, which is a continuation of application
(Continued)

(51) Int. Cl.
*H04L 29/06* (2006.01)
*H04M 3/22* (2006.01)
(Continued)

(52) U.S. Cl.
CPC ............ *H04L 65/605* (2013.01); *H04L 43/12* (2013.01); *H04L 63/00* (2013.01);
(Continued)

(58) Field of Classification Search
USPC ...................................... 379/93.14
See application file for complete search history.

(56) References Cited

U.S. PATENT DOCUMENTS

| 5,790,798 A | 8/1998 | Beckett, II et al. |
| 6,047,060 A | 4/2000 | Fedorov et al. |
| (Continued) | | |

FOREIGN PATENT DOCUMENTS

| EP | 1389862 A1 | 2/2004 |
| GB | 2389736 | 12/2003 |
| (Continued) | | |

OTHER PUBLICATIONS

International Search Report, PCT/US2008/054271 (U.S. Appl. No. 11/678,315), dated Jul. 7, 2008.
(Continued)

*Primary Examiner* — Amal S Zenati

(57) ABSTRACT

A communication system including a media server through which communication packets are exchanged for recording and monitoring purposes is disclosed. A tap is associated with each communication endpoint allowing for cradle to grave recording of communications despite their subsequent routing or branching. An incoming communication is routed to a first tap and upon selection of a receiving party; the first tap is routed to a second tap which forwards communication packets on to the receiving party. The taps may be used to forward communication packets to any number of other taps or destinations, such as a recording device, monitoring user, or other user in the form of a conference.

24 Claims, 5 Drawing Sheets

Related U.S. Application Data

No. 11/678,315, filed on Feb. 23, 2007, now Pat. No. 8,427,981.

(51) Int. Cl.
*H04M 3/42* (2006.01)
*H04M 3/51* (2006.01)
*H04L 12/26* (2006.01)

(52) U.S. Cl.
CPC .......... *H04L 63/1425* (2013.01); *H04L 63/30* (2013.01); *H04L 65/104* (2013.01); *H04L 65/1006* (2013.01); *H04L 67/42* (2013.01); *H04M 3/2281* (2013.01); *H04M 3/42221* (2013.01); *H04M 3/51* (2013.01)

(56) References Cited

U.S. PATENT DOCUMENTS

| | | |
|---|---|---|
| 6,263,049 B1 | 7/2001 | Kuhn |
| 6,363,145 B1 | 3/2002 | Shaffer et al. |
| 6,408,064 B1 | 6/2002 | Fedorov et al. |
| 6,542,602 B1 | 4/2003 | Elazer |
| 6,904,143 B1 | 6/2005 | Peterson et al. |
| 6,970,554 B1 | 11/2005 | Peterson et al. |
| 7,010,109 B2 | 3/2006 | Gritzer et al. |
| 7,055,174 B1 | 5/2006 | Cope |
| 2003/0179747 A1* | 9/2003 | Pyke .................. H04M 3/2281 370/389 |
| 2006/0221941 A1* | 10/2006 | Kishinsky ............. H04M 3/523 370/352 |
| 2007/0019618 A1* | 1/2007 | Shaffer ............. H04L 29/06027 370/352 |

FOREIGN PATENT DOCUMENTS

| | | |
|---|---|---|
| WO | 02/075559 A1 | 9/2002 |
| WO | 2004/091250 A1 | 10/2004 |
| WO | 2006/124945 A1 | 11/2006 |

OTHER PUBLICATIONS

Extended European Search Report, PCT/US2008/054271 (U.S. Appl. No. 11/678,315), dated Feb. 10, 2011.

\* cited by examiner

SYSTEM AND METHOD FOR RECORDING AND MONITORING COMMUNICATIONS USING A MEDIA SERVER

FIELD OF INVENTION

The present invention generally relates to telecommunication systems and methods, as well as systems for monitoring and recording communications. More particularly, the present invention pertains to a system and method for flexibly monitoring and/or creating trusted and secure recordings of communications over a digital transmission line.

BACKGROUND

Current telecommunication technology allows for monitoring and recording of communications. Contact centers have traditionally used standard analog transmission methods for connecting agents to incoming callers. However, monitoring and recording of communications in such an environment is resource intensive and can require multiple breaks in the recording as parties are transferred or otherwise enter and leave a communication session. This presents a problem for users that wish to generate uninterrupted "cradle to grave" recordings for quality control, verification, and other purposes. Users may also wish to make separate recordings of each party to a communication in order to provide a further level of authentication.

Many contact centers have begun installing systems capable of routing voice communications over a digital network. In order to facilitate recording, however, a communication still has to be rerouted through the main server. This increases the resource load on the server, reduces overall scalability, and creates constraints which make it more difficult to flexibly create uninterrupted recordings of individual parties.

SUMMARY

Various technologies and techniques are disclosed for recording and monitoring communications over a digital transmission line. In one form, a main contact center server receives a notification of an incoming communication from an outside party. The server then instructs a separate media server to create a tap for monitoring the digital communication packets received from and transmitted to the outside caller. The packets arriving at the tap are simply passed through with no order or timing adjustment. As a result, the tap incurs only a small amount of latency in the communication path. Single party recording is easily achieved since the tap will continue to be associated with a party even when the party is transferred to another agent or put in a hold queue.

In another embodiment, the tap is used by the media server to record all communications sent and received by an outside party. If the party is placed in a hold queue, the recording pauses until the party is connected to an agent. A beep or other identifier can be inserted in the recording to signal that an interruption had occurred.

In yet another embodiment, a tap is used to monitor all communications sent to and received by an agent. The data captured by the tap is then sent to a third party, such as a supervisor, for observation or training purposes.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

BRIEF DESCRIPTION OF THE DRAWINGS

FIG. 1b is a logical view of one possible configuration for the computer system of FIG. 1a.

DETAILED DESCRIPTION

Figure 1A:
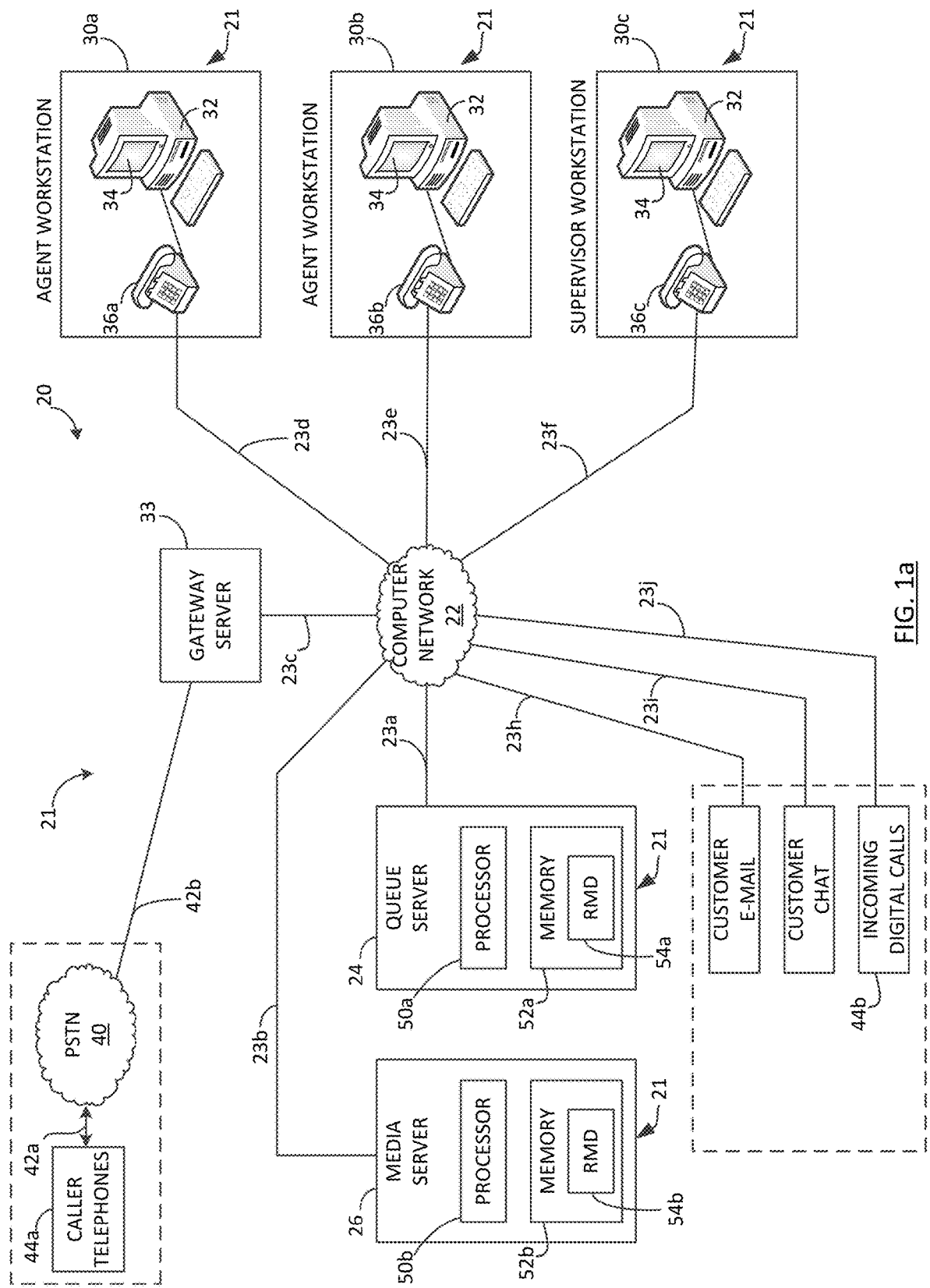
FIG. 1a is a diagrammatic view of a computer system of one implementation.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One implementation includes a unique system and methods for monitoring communications over a digital transmission line using a media server which functions to receive and route packets to selected network communication endpoints, such as in a contact center. It shall be understood that the principles of the present invention may also be applied to similar systems, such as by way of non-limiting example, a corporate telecommunication system.

FIG. 1a is a diagrammatic view of computer system 20 of one embodiment of the present invention. Computer system 20 includes computer network 22. Computer network 22 couples together a number of computers 21 over network pathways 23. More specifically, system 20 includes several servers, namely Queue Server 24, Gateway Server 33, and Media Server 26. System 20 also includes a plurality of client workstations 30. While computers 21 are each illustrated as being a server or client, it should be understood that any of computers 21 may be arranged to include both a client and server. Furthermore, it should be understood that while six computers 21 are illustrated, more or fewer may be utilized in alternative embodiments.

Queue Server 24 and Media Server 26 include one or more processors or CPUs (50a and 50b, respectively) and one or more types of memory (52a and 52b, respectively). Each memory 52a and 52b, includes a removable memory device (54a and 54b, respectively). Although not shown to preserve clarity, each computer 21 of system 20 includes one or more processors or CPUs and one or more types of memory. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to Gateway Server 33, by pathway 42*b*. Caller telephones 44 may be coupled to PSTN 40 by pathway 42*a*. It should be understood that callers using analog telephones 44*a* will normally connect to the PSTN 40 by dialing a standard directory phone number, such as an "800" number. The PSTN then sends a connection request to the Gateway Server 33, which translates the request to a digital format for retransmission to Queue Server 24 via network 22. The Queue Server 24 then establishes an audio connection with the PSTN, using Gateway Server 33 as the digital/analog conversion point.

However, callers using digital telephones 44*b* have the additional option of bypassing both the PSTN 40 and the Gateway Server 33 and directly dialing the digital address of the network 22 or the Queue Server 24. In this scenario, the digital telephone sends a connection request, such as a SIP invitation, to the Queue Server 24 via network 22. The Queue Server 24 then establishes a digital audio connection with the digital telephone 44*b* via network 22.

Workstations 30 each include a workstation computer 32 coupled to a display 34. Workstation computers 32 may be of the same type, or a heterogeneous combination of different computing devices. Likewise, displays 34 may be of the same type, or a heterogeneous combination of different visual devices. It should be understood that while three workstations 30 are described in the illustrative embodiment, more or fewer may be utilized in alternative embodiments. Contact center applications of system 20 typically include many more workstations of this type at one or more physical locations, but only a few are illustrated in FIG. 1*a* to preserve clarity. In addition, each workstation 30 can be configured as an agent workstation, a supervisor workstation, or as both an agent and a supervisor workstation. In the illustrative embodiment, workstations 30*a* and 30*b* are configured as agent workstations and workstation 30*c* is configured as a supervisor workstation.

Digital telephones 36*a*, 36*b*, and 36*c* are each associated with a different one of workstations 30*a*, 30*b*, and 30*c*, respectively. Additionally, digital telephones 36 may be integrated into the agent computer 32 and/or implemented in software. It should be understood that digital telephones 36, which are capable of being directly connected to network 22, may be in the form of a handset, headset, or other arrangement as would occur to those skilled in the art. It shall be further understood that the connection from computer network 22 to a workstation 30 can be made first to the associated workstation phone, then from the workstation phone to the workstation computer by way of a pass through connection on the workstation phone. Alternatively, two connections from the network can be made, one to the workstation phone and one to the workstation computer. Although not shown to preserve clarity, each agent workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40.

In one embodiment, system 20 operates as a contact center at one or more physical locations that are remote from one another with Queue Server 24 being configured as a contact center server host, Media Server 26 being configured as a server for monitoring agent communications, and workstations 30 each arranged as a contact center client host. It shall be understood that one or more Media Servers 26 may be included to handle the recording and monitoring load in a contact center, but only one has been shown in FIG. 1*a* to preserve clarity. Also, one or more Queue Servers 24 may be configured as a contact center server host at one or more physical locations and may also be configured to provide, collectively or individually, the features of Media Server 26 described herein. Furthermore, any of the computers 21 may be incorporated into other devices or located in geographically different locations from one another.

Alternatively or additionally, system 20 may be arranged to provide for distribution and routing of a number of different forms of communication, such as telephone calls, voice mails, faxes, e-mail, web chats, instant messages, web call backs, and the like. In addition, business/customer data associated with various communications may be selectively accessed by system 20. This data may be presented to an agent at each agent workstation 30 by way of monitor 34 operatively coupled to the corresponding agent computer 32.

Incoming communication signaling and audio stream data may arrive in either an analog or digital format. In the case of analog communications arriving from the PSTN 40, both the signaling and audio stream data must be translated to a digital format by a conversion device, such as Gateway Server 33, before being propagated over network 22 to a server or workstation. Likewise, outgoing communication data will exist in a digital format while propagating over network 22 but will need to be converted to an analog PSTN format before being passed to PSTN 40.

If communication data is being sent to a digital device that is connected directly to network 22, no digital/analog conversion is required. As a non-limiting example, an outside caller using a digital phone may establish a direct digital communication stream with an agent workstation after being assigned to that agent by Queue Server 24. In fact, all signaling and audio stream data between endpoints on network 22 will remain in a digital format. References to digital audio communications in the illustrative embodiment shall be understood to include all forms of digital telephony such as VOIP, SIP, and SRTP to name just a few representative examples. The present system and method may be applied to many other types of communications and their use within the current system and method is desired to be protected.

Figure 2:
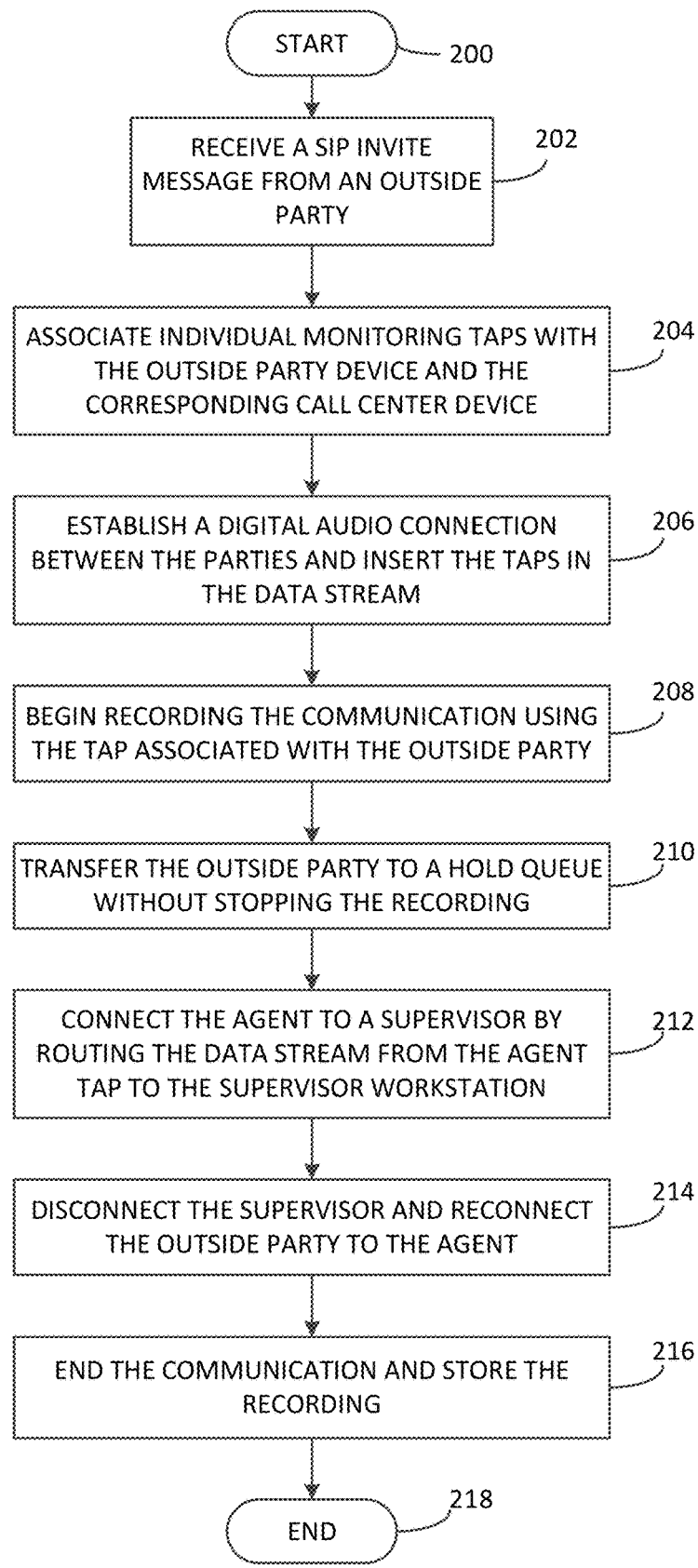
FIG. 2 is a process flow diagram demonstrating one example of the stages involved in creating a recording of an incoming communication in one embodiment of the present system and method.

Turning now to FIG. 2, with continued reference to FIG. 1a, the stages for recording a communication using a media server in one embodiment of the present system and method is shown. In one form, the process of FIG. 2 is at least partially implemented in the operating logic of system 20. The process begins at start point 200 with the Queue Server 24 receiving a request, such as a SIP invitation, to establish a communication session with an outside party (stage 202). If the outside party is using an analog phone, the Gateway Server 33 acts as the digital/analog conversion point between the parties. The Gateway Server 33 receives the communication initiation request from the PSTN, performs an analog to digital conversion, and sends a SIP invitation to the Queue Server 24. If, however, the outside party is using a digital device, such as a SIP enabled phone, the outside party device can route the request directly to the Queue Server 24, bypassing the Gateway Server 33.

In the illustrative embodiment, the Queue Server 24 instructs the Media Server 26 to establish individual monitoring taps for each known party prior to creating the communication session (stage 204). For example, if the outside party is initially routed to an IVR, individual taps would be associated with the outside party and the IVR device.

Figure 1B:
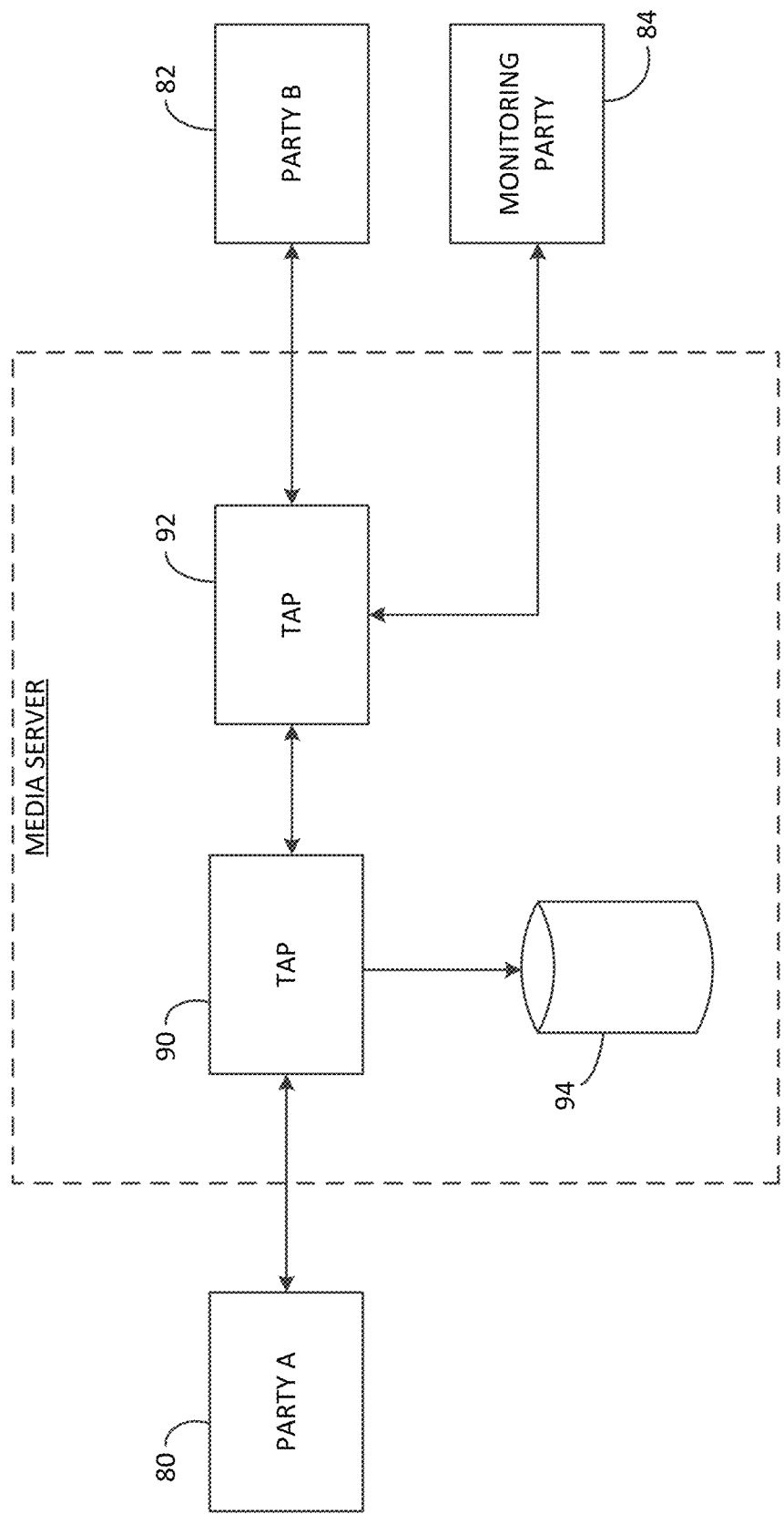

In the illustrative embodiment, a tap is a logical component residing on the Media Server 26 to duplicate or record packets from a network stream, perform some processing upon them, and subsequently forward them along to their intended destination. A simple tap association for a communication arrangement between two parties having monitoring and recording functionality is shown in FIG. 1b. The illustrative communication involves two parties, Party A and Party B using digital communication devices 80 and 82 respectively. Party A's device 80 is connected with tap 90 while Party B's device 82 is similarly connected to tap 92. It shall be appreciated that taps 90 and 92 are within Media Server 26. Communication packets sent from Party A are received by tap 90, forwarded to tap 92, and subsequently forwarded to Party B. Going the other way, communication packets sent from Party B are received by tap 92, forwarded to tap 90, and subsequently forwarded to Party A.

In order to provide additional functionality, Media Server 26 may be configured to forward communication packets from a tap, such as tap 90 as shown, to a recording device 94. In a further form, the recording device 94 may be combined with tap 90. Additionally, Media Server 26 may forward communication packets from a tap, such as tap 92 as shown, to another device, such as digital communication device 84 associated with a Monitoring Party.

Returning to FIG. 2, as new parties are added to the session, the Media Server 26 creates additional taps for those parties, such as those illustrated in FIG. 1B. In other embodiments, taps may only be created for designated parties, depending on the configuration of the Media Server 26. It should be understood that the Media Server 26 can create taps at any time prior to or during a communication session.

After the taps are created, the Queue Server 24 establishes a digital communication stream between the parties (stage 206). The taps may be specified as destinations, allowing the Media Server 26 to receive and route the communication data packets. In one form, the individual taps simply pass the data (digital audio in this embodiment) through with no processing or time correction, thereby incurring virtually no latency on the communication path. In another form, the data passed through the tap may be processed if, for example, the transmitting and receiving devices use different digital audio protocols. The taps may also replicate the incoming data packets, process them, such as mixing the streams from both parties or encode/decode them, and forward them to a selected device for recording and/or monitoring purposes.

At any point during the communication session, the Queue Server 24 may send a request to the Media Server 26 to record the communication session. In the illustrative embodiment, the request includes information identifying the communication to be recorded as well as a set of configuration options. This identifying information may include a specification of which individual parties are to be recorded, a unique communication identifier, or any other identifier known to one of skill in the art. Additionally, the configuration options may include, but are in no way limited to, the amount of each communication to record, the method of storage for the communication, an optional recording format, encryption parameters, encryption and authentication keys, and/or a storage location.

After receiving the request, the Media Server 26 begins recording the communication data passing through the tap associated with the outside party by writing the data packets to a file on the Media Server 26 (stage 208). This is the normal scenario when a recording of the communication sent to and received from the outside party is needed for later verification, such as with financial transactions. In further embodiments, the Media Server 26 monitors multiple taps and records them as individual files or collective files combining the communications of two or more parties, as specified by the configuration options. It shall be appreciated that the communication data may be received by the Media Server 26 in one format and saved to file in another more favorable format. Additionally, system 20 may notify the parties that the call may be recorded to comply with legal requirements.

In a further form, to ensure call privacy, the audio data packets may be encrypted. The tap may thus have to decrypt the duplicated packets before processing them for recording and/or monitoring. In an alternate embodiment, the audio packets are recorded in encrypted form to avoid Queue Server 24 having to disclose the encryption keys to the Media Server 26. In yet another embodiment, the tap decrypts the packets before forwarding them to the agent phones 36 and encrypts the packets from the agent phones. This arrangement is useful if the local network is trusted and the agent phones do not support encryption. In a still further form, the Queue Server 24 discloses the keys to the Media Server 26 which decrypts the packets for recording and encrypts the recorded packets using a new key. The packets may then be forwarded to their destinations having their original encoding using the keys disclosed by the Queue Server 24 while the player eventually used to playback the recording may operate using a distinct key system.

In response to a request by the agent to consult privately with a supervisor during the communication, the Queue Server 24 transfers the outside party to a hold queue (stage 210). In the illustrative embodiment, the Media Server 26 pauses the recording through the outside party tap and inserts a beep or other audio marker for later verification that the outside party was placed on hold. In another embodiment, additional meta-data, such as timestamps are added to the recording to indicate the duration of a hold operation. However, this does not close the recording file associated with the outside party on the Media Server 26. In a further embodiment, the Media Server 26 continues to record the data flowing through the outside party tap, including any on-hold music, IVR responses, or messages broadcast by the Queue Server 24. In yet another embodiment, only the audio from the external caller is recorded during hold operations and the hold-music or messages played to the caller are excluded from the recording.

Once the outside party has been transferred to a hold queue, the Queue Server 24 connects the agent to a supervisor for consultation as requested, with no interruption in the recording of the outside party tap (stage 212). Upon completion of the consultation or by request of the agent, the Queue Server 24 removes the outside caller from the hold queue, reconnects the agent, and resumes the recording if it had been paused (stage 214). At some later point in the communication session (normally when the outside party disconnects), the Queue Server 24 instructs the Media Server 26 to end the recording (stage 216). In one form, the recording may be stored on Media Server 26 and subsequently transferred to a central server for archival. In another form, the recording may be encrypted and/or hashed as it is archived or stored to preserve confidentiality and/or prevent/detect tampering. In yet another form, in the event of a spoken communication, language processing techniques may be utilized to create and store a transcript of the recorded communication. Once the recording has been stored, the process ends at point 218.

Figure 3:
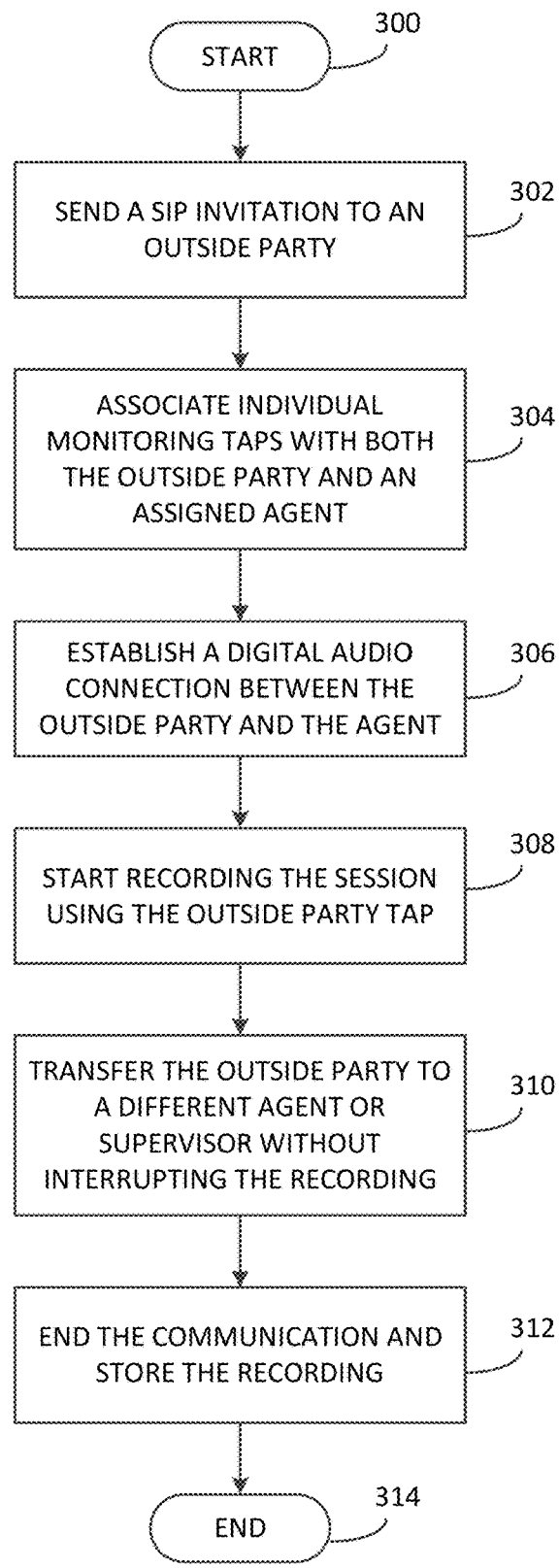
FIG. 3 is a process flow diagram demonstrating one example of the stages involved in creating a recording of an outgoing communication in another embodiment of the present system and method.

FIG. 3 illustrates an example of the stages involved in recording an outgoing communication from the contact center using the Media Server 26. The process begins at start point 300 with the Queue Server 24 sending a request, such as a SIP invitation, to an outside party device to establish a communication session (stage 302). As discussed above, the Gateway Server 33 is utilized as a conversion point if the receiving outside party is using an analog phone or a digital phone based on a different digital protocol. Once the outside party device replies with an acceptance, the Queue Server 24 assigns an agent to the session and instructs the Media Server 26 to establish monitoring taps with each of the parties (stage 304). The Queue Server 24 then establishes a digital communication stream between the parties (stage 306) and instructs the Media Server 26 to begin recording the communication using the outside party tap (stage 308). It shall be understood that the instruction to begin recording may be included in the same request as the instruction to create the monitoring taps.

After communicating with the outside party, the agent may decide to transfer the outside party to a different agent or supervisor (stage 310). The Queue Server 24 disconnects the first agent from the session and connects a second agent or supervisor to the outside party. Since the recording is being made through the outside party tap, there is no interruption in the recording during the transfer. Once the communication session is completed, the Media Server 26 stores the recording for later retrieval (stage 312). The process then ends at point 314.

Figure 4:
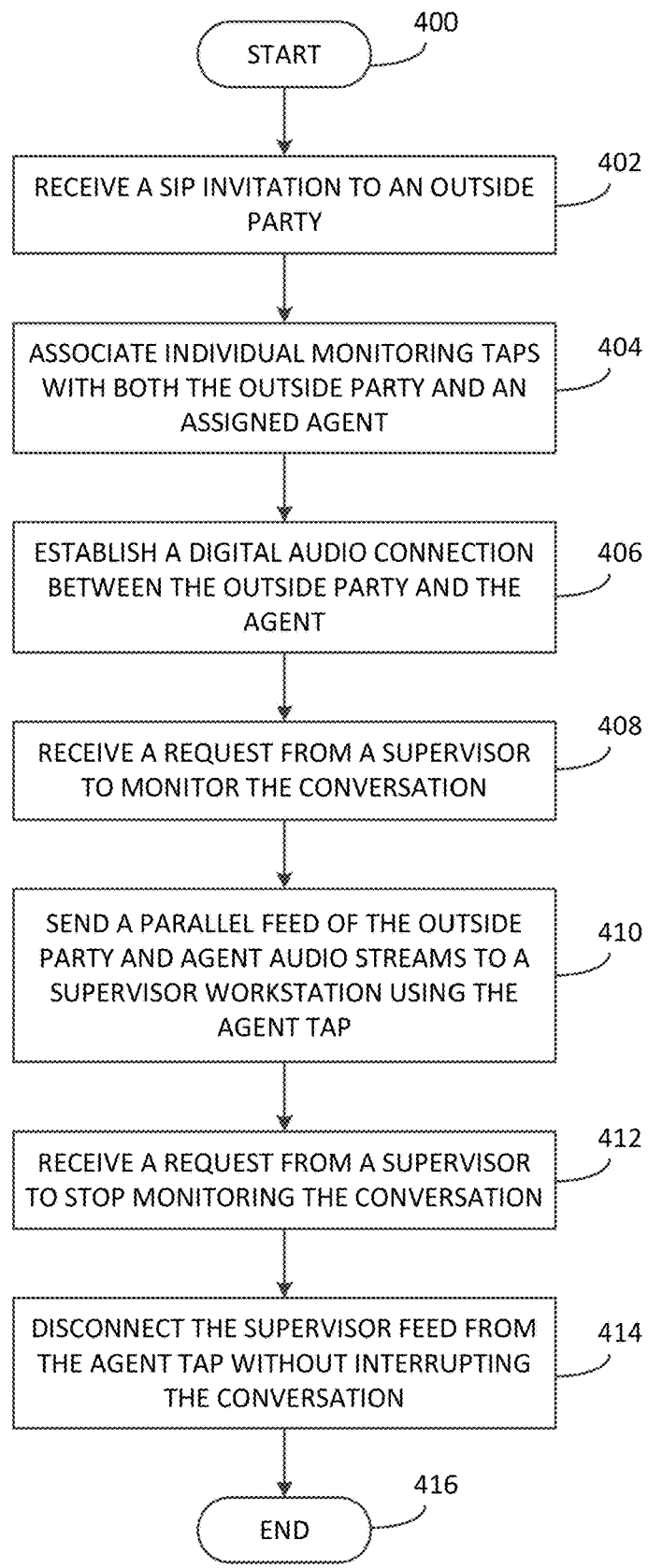
FIG. 4 is a process flow diagram demonstrating one example of the stages involved in supervisory monitoring of a communication session.

FIG. 4 illustrates the stages involved in monitoring an agent communication in real time, such as when a supervisor wishes to listen in on a communication between an agent and an outside party for training or quality assurance purposes. The process begins at start point 400 with the Queue Server 24 receiving a request from an outside party to establish a communication session (stage 402). The Queue Server 24 then instructs the Media Server 26 to associate monitoring taps with the outside party and an available agent (stage 404) and establishes a digital communication stream between the parties (stage 406). In a further form, the system may be configured to associated taps with all communications, even if they are not recorded and/or monitored initially to avoid interruption in the event recording and/or monitoring is later required.

After receiving a request from a supervisor to monitor the communication (stage 408), the Media Server 26 sends a parallel feed of the digital audio received by the outside party tap to the supervisor workstation, allowing the supervisor to listen to the communication with no discernible interruption in the conversation between the agent and the outside party (stage 410). It shall be appreciated that there may be multiple concurrent supervisors receiving streams from the same tap, as stage 410 may be performed multiple times at any point during an active communication. Upon receiving a request from the supervisor workstation to stop monitoring the conversation (stage 412), the Media Server 26 disconnects the parallel feed to the supervisor tap, again with no discernible interruption in the communication between the outside party and the agent (stage 414). The process ends when the outside party disconnects at point 416.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method of conducting digital communication, the method comprising the steps of:
   a. connecting a first digital point to a first device;
   b. connecting a second digital point to a second device;
   c. connecting the first device to the second device;
   d. receiving a first version of a first communication from the first digital point at the first device;
   e. creating a second version of the first communication, different from the first version of the first communication, at a location that is only one of:
      i. the first device; and
      ii. a device connected to the first device;
   f. receiving at the second device from the first device the second version of the first communication;
   g. creating a third version of the first communication, different from the first and second versions of the first communication, at a location that is only one of:
      i. the second device; and
      ii. a device connected to the second device;
   h. receiving at the second digital point from the second device the third version of the first communication; and i. pausing a recording of the first communication from the first digital point while continuing a recording of the first communication from the second digital point.

2. The method according to claim 1 that has one or more of the following characteristics:
the first device and the second device are located on a server; and
wherein only one of:
i. none of the versions of the first communication are identical; and
ii. any of the versions of the first communication are identical.

3. The method according to claim 1 further including only one of the following steps:
a. saving the second version of the first communication as a first record, and saving the third version of the first communication as a second record;
b. monitoring the second version of the first communication, and monitoring the third version of the first communication;
c. saving the second version of the first communication as a first record, and monitoring the third version of the first communication; and
d. monitoring the second version of the first communication, and saving the third version of the first communication as a second record.

4. The method according to claim 3 further including the steps of:
a. associating a first party with the first digital point; and
b. associating a second party with the second digital point.

5. The method according to claim 4 that has one or more of the following characteristics:
the first device and the second device comprise taps; and
the first device and the second devices are located on a server.

6. The method according to claim 3 further including the steps of:
a. receiving a first version of a second communication from the second digital point at the second device;
b. creating a second version of the second communication at a location that is one of:
i. the second device; and
ii. a device connected to the second device;
c. receiving at the first device from the second device the second version of the second communication;
d. creating a third version of the second communication at a location that is one of:
i. the first device; and
ii. a device connected to the first device; and
e. receiving at the first digital point from the first device the third version of the second communication.

7. The method according to claim 3 that has only one of the following characteristics:
none of the versions of the second communication are identical; and
any of the versions of the second communication are identical.

8. The method according to claim 6 further including only one of the following steps:
a. saving the second version of the second communication in the second record, and saving the third version of the second communication in the first record;
b. monitoring the second version of the second communication, and monitoring the third version of the second communication;
c. saving the second version of the second communication in the second record, and monitoring the third version of the second communication; and,
d. monitoring the second version of the second communication, and saving the third version of the second communication in the first record.

9. The method according to claim 8 further including the steps of:
a. associating a first party with a first digital point; and
b. associating a second party with a second digital point.

10. The method according to claim 8, the method further including the steps of:
a. receiving a first version of a third communication from a third digital point at a third device;
b. creating a second version of the third communication at a location that is only one of:
i. the third device; and
ii. a device connected to the third device;
c. saving the second version of the third communication as part of a third record;
d. receiving at the first device from the second device the second version of the third communication;
e. creating a third version of the third communication at a location that is only one of:
i. the first device; and
ii. a device connected to the third device;
f. saving the third version of the third communication as part of the first record; and
g. receiving at the third digital point from the third device the third version of the third communication.

11. The method according to claim 10 that has only one of the following characteristics:
none of the versions of the third communication are essentially identical; and
any of the versions of the third communication are identical.

12. The method according to claim 8 further including the steps of:
a. associating a third party with a third digital point;
b. connecting the third digital point to the first device;
c. receiving a first version of a different first communication from the first digital point at the first device;
d. creating a second version of the different first communication at a location that is only one of:
i. the first device; and
ii. a device connected to the first device;
e. receiving at the third digital point from the first device the second version of the different first communication; and
f. saving the second version of the different first communication in the first record.

13. The method according to claim 12 that has one or more of the following characteristics:
wherein only one of:
i. none of the versions of the different first communication are identical; and
ii. any of the three versions of the different first communication are identical; and the first device and the second device are located on a server.

14. The method according to claim 12 further including the step of disconnecting the second digital point from the first digital point after step (a).

15. The method according to claim 14 further including the steps of:
   a. receiving a first version of a third communication from the third digital point at the first device;
   b. creating a second version of the third communication at a location that is only one of:
      i. the first device; and
      ii. a device connected to the first device;
   c. saving the second version of the third communication as part of the first record; and
   d. receiving at the first point from the first device the second version of the third communication.

16. The method according to claim 15 that has only one of the following characteristics:
   none of the versions of the third communication are identical; and
   any of the three versions of the third communication are identical.

17. The method according to claim 12, the method further including the steps of:
   a. receiving a first version of a third communication from the third digital point at a third device;
   b. creating a second version of the third communication at a location that is only one of:
      i. the third device; and
      ii. a device connected to the third device;
   c. saving the second version of the third communication as part of a third record;
   d. receiving at the first device from the second device the second version of the third communication;
   e. creating a third version of the third communication at a location that is only one of:
      i. the first device; and
      ii. a device connected to the third device;
   f. saving the third version of the third communication as part of the first record; and
   g. receiving at the third digital point from the third device the third version of the third communication.

18. The method according to claim 17 that has only one of the following characteristics:
   none of the versions of the third communication are identical; and
   any of the versions of the third communication are identical.

19. The method according to claim 12 further including the steps of:
   a. connecting a third device between the first point and the third point;
   b. receiving at the third device from the first device the first or second version of the different first communication;
   c. creating a third version of the different first communication at a location that is only one of:
      i. the third device; and
      ii. a device connected to the third device;
   d. saving the third version of the different first communication as a third record; and
   e. receiving at the third digital point from the third device the third version of the different first communication.

20. The method according to claim 19 that has only one of the following characteristics:
   none of the versions of the different first communication are identical; and
   any of the versions of the different first communication are identical.

21. The method according to claim 19 further including the step of disconnecting the second digital point from the first digital point after step (a) in claim 19.

22. A communication as in claim 1 in which the communication is bi-directional.

23. The step of claim 22 wherein creating a version of a communication comprises a transformation of the two channels of a bi-directional communication.

24. The transformation of claim 23 wherein said transformation comprises mixing.

* * * * *